US010225813B2

(12) United States Patent
Tang et al.

(10) Patent No.: US 10,225,813 B2
(45) Date of Patent: Mar. 5, 2019

(54) INFORMATION PROCESSING IN MOBILE DEVICES

(71) Applicant: Intel IP Corporation, Santa Clara, CA (US)

(72) Inventors: Yunshuai Tang, Xi'an Shaanxi Province (CN); Yanzeng Fu, Xi'an Shaanxi Province (CN); Hong Zhang, Xi'an Shaanxi Province (CN); Jie Lei, Xi'an Shaanxi Province (CN); Zhen Wang, Xi'an Shaanxi Province (CN); Zhuanni Jia, Xian (CN); Lei Li, Xian (CN)

(73) Assignee: Intel IP Corporation, Santa Clara, CA (US)

( * ) Notice: Subject to any disclaimer, the term of this patent is extended or adjusted under 35 U.S.C. 154(b) by 248 days.

(21) Appl. No.: 15/100,923

(22) PCT Filed: Jan. 29, 2014

(86) PCT No.: PCT/CN2014/000132
§ 371 (c)(1),
(2) Date: Jun. 1, 2016

(87) PCT Pub. No.: WO2015/113183
PCT Pub. Date: Aug. 6, 2015

(65) Prior Publication Data
US 2016/0309437 A1    Oct. 20, 2016

(51) Int. Cl.
*H04W 4/00*        (2018.01)
*H04W 56/00*       (2009.01)
(Continued)

(52) U.S. Cl.
CPC ......... *H04W 56/0035* (2013.01); *H04L 5/001* (2013.01); *H04L 27/2657* (2013.01);
(Continued)

(58) Field of Classification Search
None
See application file for complete search history.

(56) References Cited

U.S. PATENT DOCUMENTS

2001/0047424 A1* 11/2001 Alastalo ............... H04B 7/0842
                                                                709/236
2007/0153879 A1*  7/2007 Cho ..................... H04L 27/0014
                                                                375/148

(Continued)

FOREIGN PATENT DOCUMENTS

| CN | 101005475 A | 7/2007 |
| CN | 101083647 A | 12/2007 |
| CN | 101944977 A | 1/2011 |

OTHER PUBLICATIONS

"International Application Serial No. PCT/CN2014/000132, International Search Report dated Oct. 28, 2014", 4 pgs.
"International Application Serial No. PCT/CN2014/000132, Written Opinion dated Oct. 28, 2014", 5 pgs.
(Continued)

*Primary Examiner* — Bob A Phunkulh
(74) *Attorney, Agent, or Firm* — Schwegman Lundberg & Woessner, P.A.

(57) ABSTRACT

A receiving device, user equipment, communication system and a method for processing synchronization information are provided. The receiving device comprises a synchronization information processing apparatus configured to combine synchronization information of a plurality of frequency channels based on time and frequency.

14 Claims, 13 Drawing Sheets

(51) Int. Cl.
*H04L 5/00* (2006.01)
*H04L 27/26* (2006.01)
(52) U.S. Cl.
CPC ...... *H04L 27/2662* (2013.01); *H04L 27/2689* (2013.01); *H04L 27/2688* (2013.01)

(56) References Cited

U.S. PATENT DOCUMENTS

| | | | | |
|---|---|---|---|---|
| 2008/0232496 | A1* | 9/2008 | Lin | H04L 27/2663 375/260 |
| 2009/0060108 | A1* | 3/2009 | Hafuka | H04L 7/042 375/371 |
| 2010/0008216 | A1* | 1/2010 | Li | H04L 5/0048 370/208 |
| 2010/0046660 | A1* | 2/2010 | Sikri | H04W 56/00 375/285 |
| 2010/0265999 | A1 | 10/2010 | Stern et al. | |
| 2012/0108175 | A1* | 5/2012 | Luo | H04L 5/0007 455/63.1 |
| 2013/0016767 | A1* | 1/2013 | Pean | H04L 1/0001 375/232 |
| 2014/0321450 | A1* | 10/2014 | Zhang | H04L 7/0016 370/350 |
| 2015/0023265 | A1* | 1/2015 | Park | H04B 7/024 370/329 |

OTHER PUBLICATIONS

"International Application Serial No. PCT/CN2014/000132, International Preliminary Report on Patentability dated Aug. 2, 2016", 5 pgs.

* cited by examiner

Table: Timing Error Performance Comparison

| | Terr Mean (T) | Terr STD (T) | Terr Min (T) | Terr Max (T) |
|---|---|---|---|---|
| ARFCN2&3 with Combining | 0.00 | 0.03 | -1.00 | 0.00 |
| ARFCN2 without Combining | -0.03 | 0.31 | -4.00 | 1.00 |
| ARFCN3 without Combining | -0.56 | 1.23 | -7.00 | 4.00 |

Figure 5

INFORMATION PROCESSING IN MOBILE DEVICES

This application is a U.S. National Stage Filing under 35 U.S.C. 371 from International Application No. PCT/CN2014/000132, filed Jan. 29, 2014 and published in English as WO 2015/113183 on Aug. 6, 2015, which is incorporated herein by reference in its entirety.

TECHNICAL FIELD

Aspects of the disclosure described herein generally relate to information processing in mobile devices.

BACKGROUND

Mobile broadband is expected to contribute substantially to a continued spreading of Internet access; either as complement to, or substitute for, wireline broadband access. Similar to the formidable success of mobile telephony, it is envisaged that the 3rd Generation Partnership Project (3GPP) family of standards will contribute substantially to a high penetration of mobile broadband globally. While mobile communication standards, such as GSM/GPRS/EDGE has been the most successful system for mobile telephony and rudimentary data access, LTE is becoming an attractive technology in the longer term, High Speed Packet Access (HSPA)—including High Speed Downlink Packet Access (HSDPA) and High Speed Uplink Packet Access (HSUPA; also known as Enhanced Uplink, or EUL)—will in many markets be the primary mobile broadband technology in the future.

Nowadays, in order to increase the downlink transmission throughput of mobile communication systems, Downlink Multi-Carrier (DLMC) was introduced by 3GPP to provide higher speed downlink packet service and to increase the downlink capacity. For example, the Global System for Mobile Communication (GSM) system seeks to provide a comparable transmission speed as 3G (e.g. TD-SCDMA, CDMA2000) system by employing the Downlink Multi-Carrier (DLMC) technique.

In the mobile communication systems, wireless signals usually suffer various distortions, such as fading, interference, frequency error, and timing error, etc., which degrade the performance of the mobile communication systems. Therefore, timing synchronization and frequency synchronization are extremely important for the mobile communication systems because of their sensitivity to the timing and frequency errors. To guarantee the fast and accurate data transmission, the Inter Symbol Interference (ISI) and Inter Carrier Interference (ICI) caused in the transmission have to be eliminated as much as possible. In the real world, frequency offsets will be arising from the frequency mismatch of oscillators of a transmitter and a receiver and from existence of Doppler shift in channels. In addition, due to the delay of signal when transmitting in the channels, the receiver in general starts sampling a new frame at the incorrect time instant. Therefore, it is important to estimate the frequency offset to minimize its impact, and to estimate the timing offset at the receiver to identify the start time of each frame.

In the conventional DLMC-related mobile communication systems, typically more than one Absolute Radio Frequency Channel Numbers (ARFCN) is used to transmit signals to one Mobile Station (MS), and each channel is treated independently during the timing offset estimation and frequency offset estimation. Since different channels with different ARFCN usually undergo different fading and interferences, if one channel suffers from a relatively strong interference, the timing offset estimation and frequency offset estimation for this channel will be unreliable, which degrade the entire synchronization performance of this channel.

BRIEF DESCRIPTION OF THE DRAWINGS

In the following description, aspects of this disclosure are described with reference to the following drawings, in which:

FIG. 5 is an illustration of an exemplary table showing the timing error performance comparison between the solution with the timing information combination among different channels and the solution without the timing information combination;

DESCRIPTION OF ASPECTS OF THE DISCLOSURE

Figure 1:
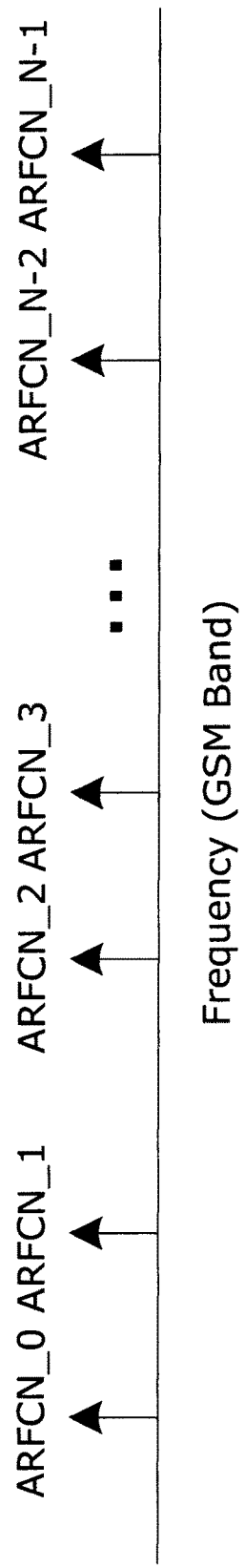
FIG. 1 is an illustration of an exemplary Downlink Multi-Carrier (DLMC) scheme.

In the DLMC-related mobile communication systems, a plurality of Absolute Radio Frequency Channel Numbers (ARFCN) are assigned to one Mobile Station (MS) or User Equipment (UE). For example, as shown in FIG. 1, there are N ARFCNs (i.e. ARFCN_0, ARFCN_1, ARFCN_2, ARFCN_3, . . . ARFCN_N−2, and ARFCN_N−1) assigned to one MS or UE, wherein N is integer and N>0. Typically, those ARFCNs are randomly distributed in a wide frequency band (e.g. 5 MHz, 10 MHz, or 20 MHz, etc.). According to the conventional synchronization solution, different channels with different ARFCNs are treated independently during the timing offset estimation and frequency offset estimation, which usually results in poor and unreliable synchronization performance and receiving performance in the MS or UE of the DLMC-related mobile communication system.

Therefore, it would be advantageous to have a method, system, device and computer program product that addresses one or more of the issues discussed above.

Some terms are used for denoting specific system components throughout the application document. As would be appreciated by those skilled in the art, different designations are usually used for denoting the same component, thus the application document does not intend to distinguish those components that are only different in name rather than in function. In the application document, terms "comprise", "include" and "have" are used in the opening way, and thus they shall be construed as meaning "comprise but not limited to . . . ". Besides, the term "coupled", as may be used herein, includes direct coupling and indirect coupling via another component. Inferred coupling, for example where one element is coupled to another element by inference, includes direct and indirect coupling between two elements in the same manner as "coupled".

The following detailed description refers to the accompanying drawings that show, by way of illustration, specific details and aspects of this disclosure. The word "exemplary" is used herein to mean "serving as an example, instance, or illustration". Any aspect of this disclosure or design described herein as "exemplary" is not necessarily to be construed as preferred or advantageous over other aspects of this disclosure or designs.

Some FIGURES may use similar reference numbers. This is merely to indicate that the same number in different FIGURES may be similar types of items. However, the same number in different FIGURES may be each its own iteration or aspect of this disclosure.

Turning back to FIG. 1, although there are a plurality of ARFCNs assigned to one MS or UE, and the fading as well as the interference suffered in different ARFCN is independent, all ARFCNs assigned to one MS or UE originate from the same transmitting device such as but not limited to Base Transceiver Station (BTS) or Base Station (BS), which means that all ARFCNs share substantially same timing error and frequency error without taking into account the frequency gap due to the ARFCN number. Since the plurality of ARFCNs can benefit from the frequency diversity, there shall be only a small chance that all ARFCNs suffer from deep fading and/or strong interference. In such a circumstance, it will be advantageous to combine the synchronization information (such as but not limited to timing synchronization information, frequency synchronization information, channel profile, or the like) of different ARFCNs assigned to the same MS, so that it is possible to take full advantage of the frequency diversity to significantly improve the synchronization performance and the receiving performance of the DLMC mobile station or UE.

Figure 2:
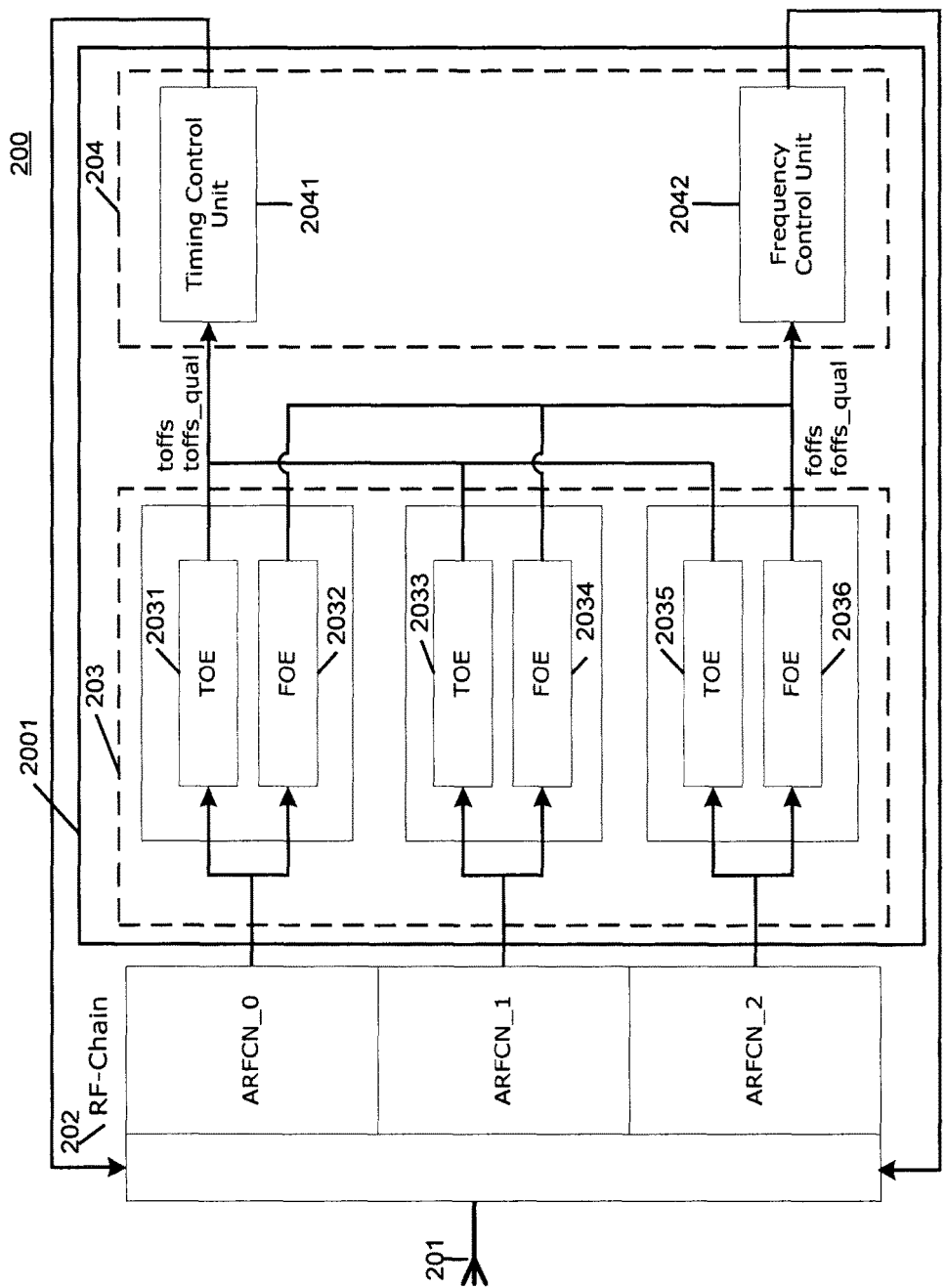
FIG. 2 shows an exemplary block diagram of a receiving device in accordance with an aspect of this disclosure.

Referring to FIG. 2, there is provided an exemplary block diagram of a receiving device in accordance with an aspect of this disclosure. The receiving device is, for example, comprised in a mobile device or UE.

As shown in FIG. 2, the receiving device 200 comprises an antenna unit 201 and a radio frequency receiving unit such as RF-Chain 202. The radio frequency diversity signals transmitted from the transmitting device such as BTS (not shown) are received by the antenna unit 201 and the RF-chain 202. There are N channels each labeled with its unique ARFCN in the RF-chain 202, wherein N is integer and N>0. For example, as shown in FIG. 2, there are three channels labeled with ARFCN_0, ARFCN_1 and ARFCN_2 in the exemplary RF-chain 202. It is appreciated that the RF-chain 202 as shown in FIG. 2 is only provided for the purpose of illustrative, the present disclosure does not intend to be limited thereto.

The signals received by the antenna unit 201 and the RF-chain 202 are amplified by a low noise amplifier (not shown in FIG. 2), and the amplified signals are converted to baseband signals by a frequency convertor (also not shown in FIG. 2).

The receiving device 200 further comprises a baseband signal processing apparatus configured to perform the baseband signal processing, such as but not limited to, the synchronization processing, demodulation processing, decoding processing, and so on.

In accordance with the aspect of this disclosure, the baseband signal processing apparatus comprises a synchronization information processing apparatus 2001 as depicted in FIG. 2. As illustrated in FIG. 2, there are, for example, an offset estimation unit 203 and a synchronization control unit 204 in the synchronization information processing apparatus 2001.

As shown in FIG. 2, the offset estimation unit 203 comprises a plurality of timing offset estimation (TOE) units 2031, 2033, 2035 and frequency offset estimation (FOE) units 2032, 2034, 2036 associated with the plurality of frequency channels ARFCN_0, ARFCN_1, and ARFCN_2.

Each of the TOE units 2031, 2033, 2035 is configured to estimate the timing offset associated with the corresponding frequency channel to generate an estimated timing offset signal represented by toffs and a timing offset estimation quality indicator (i.e. TOE quality indicator) represented by toffs_qual. According to one aspect of the disclosure, the TOE quality indicator is, for example but not limited to SNR (i.e. Signal to Noise Ratio) or SINR (Signal to Interference plus Noise Ratio) of the corresponding frequency channel.

Each of the FOE units 2032, 2034, 2036 is configured to estimate the frequency offset associated with the corresponding frequency channel to generate an estimated frequency offset signal represented by foffs and a frequency offset estimation quality indicator (i.e. FOE quality indicator) represented by foffs_qual. According to one aspect of the disclosure, the FOE quality indicator is, for example but not limited to SNR (i.e. Signal to Noise Ratio) or SINR (Signal to Interference plus Noise Ratio) of the corresponding frequency channel.

For example, the TOE unit 2031 associated with the channel ARFCN_0 is configured to estimate the timing offset for the corresponding channel ARFCN_0 to generate an estimated timing offset signal toffs and a TOE quality indicator toffs_qual. As such, the FOE unit 2032 associated with the channel ARFCN_0 is configured to estimate the frequency offset for the corresponding channel ARFCN_0 to generate an estimated frequency offset signal foffs and a FOE quality indicator foffs_qual.

The synchronization control unit 204 as depicted in FIG. 2 comprises a timing control unit 2041 and a frequency control unit 2042. The plurality of estimated timing offset signals toffs and the TOE quality indicators toffs_qual generated for the plurality of channels are fed into the timing control unit 2041, and the plurality of estimated frequency offset signals foffs and the FOE quality indicators foffs_qual generated for the plurality of channels are fed into the frequency control unit 2042.

In the timing control unit 2041, the plurality of estimated timing offset signals toffs fed into the timing control unit 2041 are combined by using a diversity combination method and by means of the TOE quality indicators, and the combined toffs is filtered and limited to generate a smooth and reliable timing adjustment value. Then, the timing adjustment value is fed back to the RF-Chain 202 to compensate for the timing offset at the receiving device, that is to say, to identify the start time of each frame and the RF receiving window position.

Also, the plurality of estimated frequency offset signals foffs fed into the frequency control unit 2042 are combined, filtered, and limited in the frequency control unit 2042 by using the diversity combination method and by means of the FOE quality indicators, and a frequency adjustment value is generated to be fed back to the RF-Chain 202 to compensate for the frequency offset at the receiving device, that is to say, to adjust a local frequency generation module (e.g. a crystal oscillator or a frequency synthesizer).

In accordance with an aspect of this disclosure, several diversity combination methods for combining the multiple received signals of a diversity reception device into a single improved signal, such as but not limited to Maximal-Ratio Combining (MRC) method, Selection Combining (SC) method, Switched combining method, Equal-gain combining method, and so on, may be employed in the timing control unit 2041 and the frequency control unit 2042.

The Maximal-Ratio Combining (MRC) method is often used in large phased-array systems, wherein the received signals are weighted with respect to their SNR and then summed. The resulting SNR yields $$\sum_{j=1}^{N} SNR_k$$

where $SNR_k$ is SNR of the received signal k. For example, if the MRC method is employed in the frequency control unit 2042 depicted in FIG. 2 and the FOE quality indicator foffs_qual is the SNR of each channel, the MRC processing will be done as following:

the weighting factors are calculated based on the equation of $$w_i = \frac{SNR_i}{\sum_{j=1}^{N} SNR_j} \quad (1)$$

and then, the plurality of estimated frequency offset signals foffs$_i$ fed into the frequency control unit 2042 are weighted summed based on the equation of $$foffs_{combine} = \sum_{i=1}^{N} w_i \cdot foffs_i \quad (2)$$

wherein i and j are the channel index, N is the total number of the channels, and foffs$_{combine}$ is the combined result.

According to the Selection combining method, the strongest signal will be selected from N received signals. When the N signals are independent and Rayleigh distributed, the expected diversity gain has been shown to be $$\sum_{k=1}^{N} \frac{1}{k},$$

expressed as a power ratio. Therefore, any additional gain diminishes rapidly with the increasing number of channels.

According to the Switched combining method, the receiving device switches to another signal when the currently selected signal drops below a predefined threshold. This is also often called "Scanning Combining".

According to the Equal-gain combining method, all of the received signals are summed coherently.

For the timing control loop that controls the RF receiving window, since the timing offset estimation results of the plurality of channels are combined together, a more stable and quicker outer timing control loop is achieved, which means that a faster timing control loop (e.g. having larger forgetting factor) is acceptable, and the response speed of the timing control loop is increased since there are more TOE samples. Furthermore, for the internal timing that estimates the signal position in the RF receiving window, since one channel utilizes the timing information (e.g. toffs and toffs_qual) of the other channels, the TOE performance for the one channel is improved.

Moreover, regarding the frequency control loop, since the frequency offset estimation results of the plurality of channels are combined together, a more stable and quicker frequency control loop is achieved, which means that a faster frequency control loop (e.g. having larger forgetting factor) is acceptable, and the response speed of the frequency control loop is increased since there are more FOE samples.

Figure 3A:
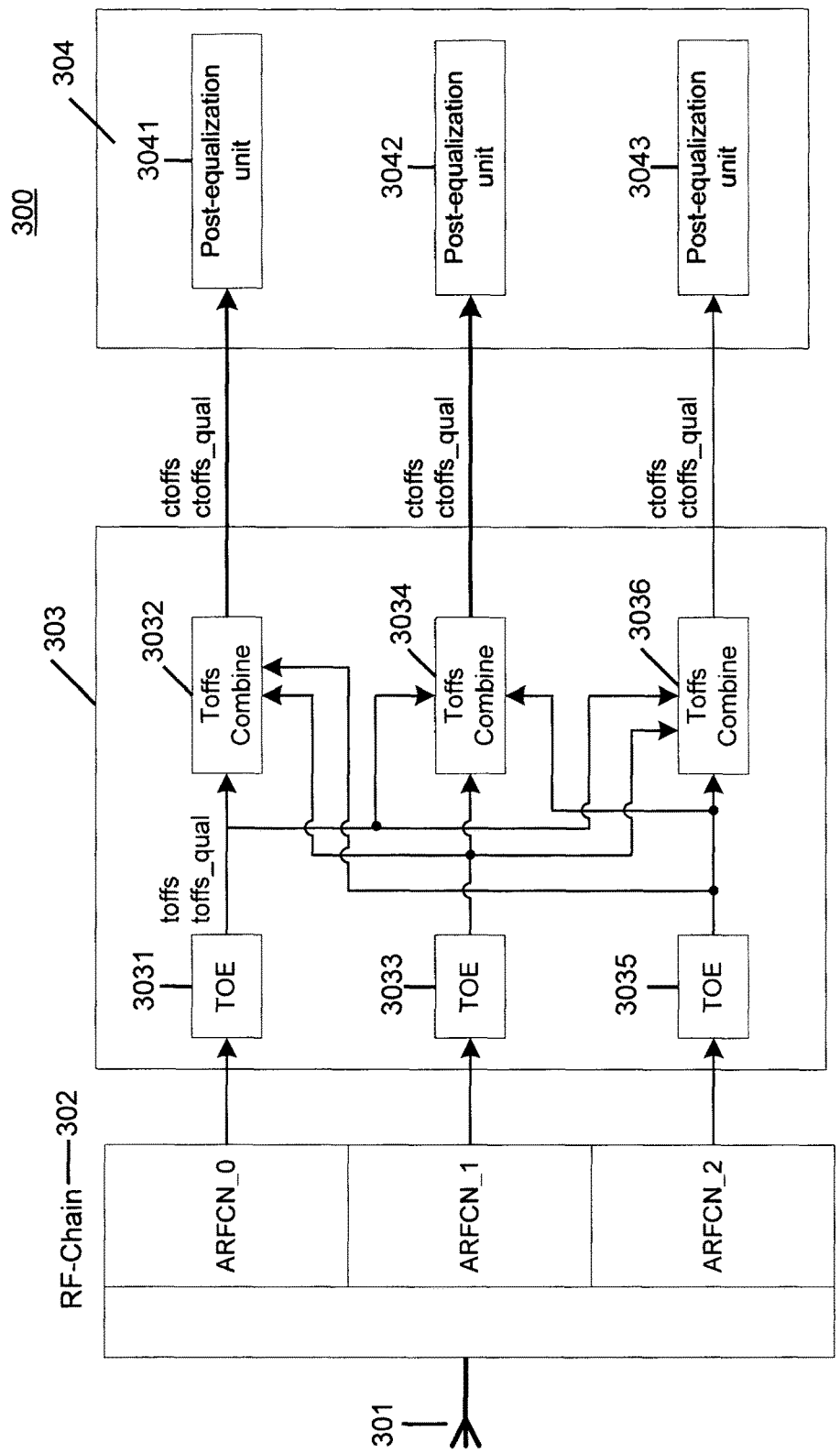
FIG. 3A shows an exemplary block diagram of a receiving device in accordance with another aspect of this disclosure.

In accordance with another aspect of this disclosure, there is provided another exemplary receiving device 300 as shown in FIG. 3A.

Similar to FIG. 2, the radio frequency diversity signals transmitted from the transmitting device are received by the antenna unit 301 and the RF-chain 302 comprised in the receiving device 300. The signals received by the antenna unit 301 and the RF-chain 302 are amplified by a low noise amplifier (not shown in FIG. 3A), and the amplified signals are converted to baseband signals by a frequency convertor (also not shown in FIG. 3A).

Then, the baseband signals outputted by the frequency converter are fed into a baseband signal processing apparatus which, for example, comprises a timing synchronization information processing apparatus 303 and a post-equalization apparatus 304.

As depicted in FIG. 3A, the timing synchronization information processing apparatus 303 comprises a timing offset estimation (TOE) unit 3031, 3033, 3035 and a timing offset combining unit 3032, 3034, 3036 for each channel ARFCN_0, ARFCN_1, ARFCN_2.

Each of the TOE units 3031, 3033, 3035 is configured to estimate the timing offset associated with the corresponding channel to generate the estimated timing offset signal toffs and the TOE quality indicator toffs_qual for the corresponding channel. For example, the TOE unit 3031 associated with the channel ARFCN_0 is configured to estimate the timing offset associated with the channel ARFCN_0 to generate the estimated timing offset signal toffs and the TOE quality indicator toffs_qual for the channel ARFCN_0, and so forth.

The estimated timing offset signal toffs and the TOE quality indicator toffs_qual generated for each of the plurality of channels are fed into the plurality of timing offset combining units 3032, 3034, 3036. For example, the outputs from the TOE unit 3031 associated with the channel ARFCN_0 are fed into the timing offset combining unit 3032 for the channel ARFCN_0, the timing offset combining unit 3034 for the channel ARFCN_1, and the timing offset combining unit 3036 for the channel ARFCN_2; also, the outputs from the TOE unit 3033 associated with the channel ARFCN_1 are fed into those three timing offset combining units 3032, 3034, and 3036.

In each of the plurality of timing offset combining units, the plurality of estimated timing offset signals toffs which have been fed into such a timing offset combining unit are combined by employing the above-mentioned diversity combination method, such as the MRC method, the Selection Combining (SC) method, the Switched combining method, the Equal-gain combining method, and so on. Also, the plurality of TOE quality indicators toffs_qual which have been fed into the timing offset combining unit are combined by employing the diversity combination method to provide a reliable TOE quality indicator to the following post-equalization unit. As a result, a combined timing offset ctoffs and a combined TOE quality indicator ctoffs_qual are generated in each of the plurality of timing offset combining units 3032, 3034, 3036, and then fed into the corresponding post-equalization unit.

Furthermore, as depicted in FIG. 3A, the post-equalization apparatus 304 comprises a post-equalization unit 3041, 3042, 3043 for each of the plurality of channels. The post-equalization units 3041, 3042, and 3043 are configured to perform the channel estimation and channel equalization, etc. In accordance with another aspect of the disclosure, the post-equalization units 3041, 3042, and 3043 are further be configured to perform the interference rejection.

Figure 3B:
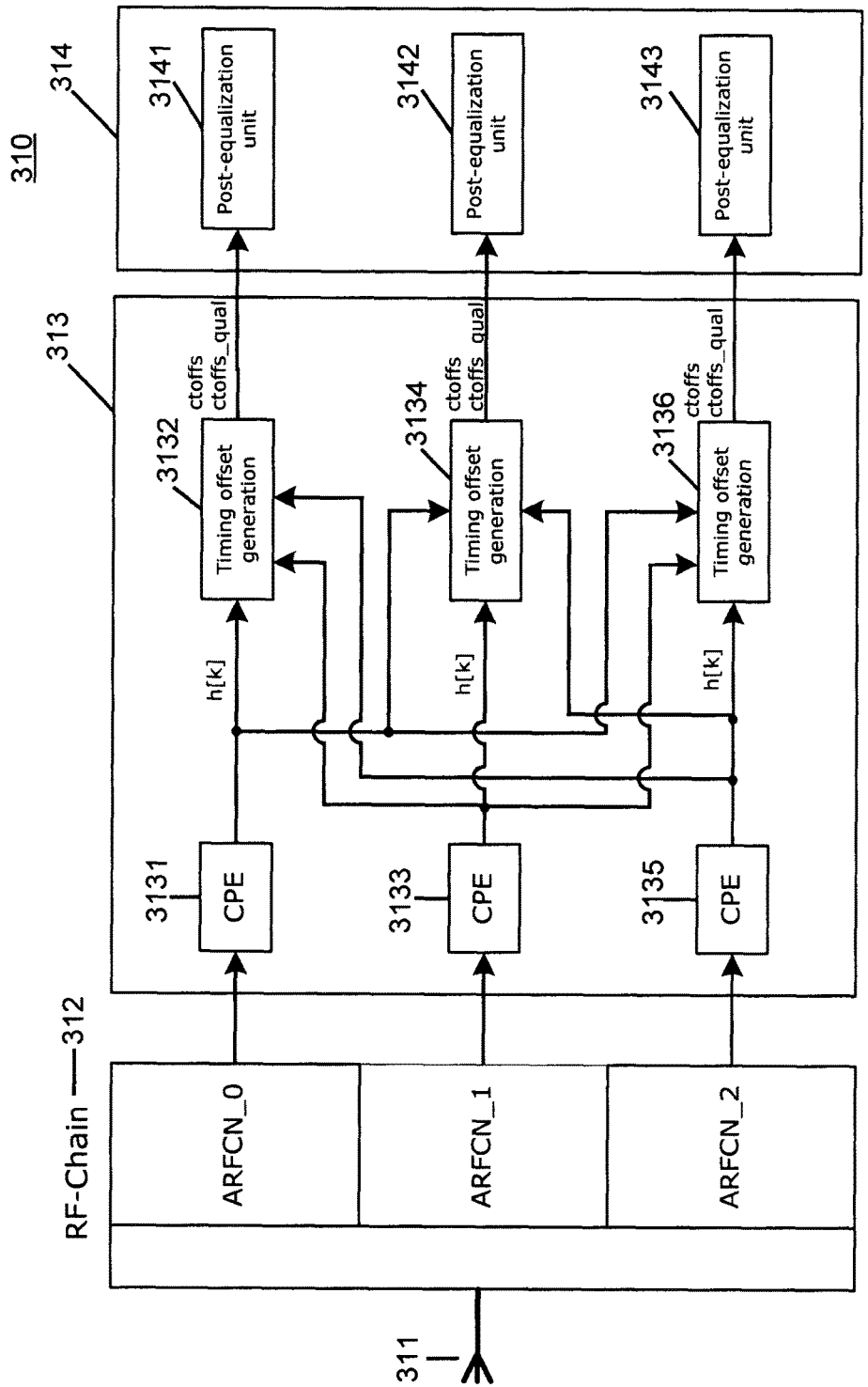
FIG. 3B shows an exemplary block diagram of a receiving device in accordance with yet another aspect of this disclosure.

In accordance with yet another aspect of this disclosure, there is provided yet another exemplary receiving device 310 as shown in FIG. 3B.

Similar to FIG. 3A, the receiving device 310 comprises an antenna unit 311 a radio frequency receiving unit such as RF-Chain 312, and a baseband signal processing apparatus.

In accordance with this aspect of the disclosure, there are, for example, a timing synchronization information processing apparatus 313 and a post-equalization apparatus 314 in the baseband signal processing apparatus.

As depicted in FIG. 3B, the timing synchronization information processing apparatus 313 comprises a channel profile estimation unit (i.e. CPE unit) 3131, 3133, 3135 and a timing offset generation unit 3132, 3134, 3136 for each of the plurality of channels.

According to the aspect of this disclosure, each of the plurality of channel profile estimation units 3131, 3133, and 3135 is configured to estimate the channel profile h[k] for the corresponding channel, wherein k is the path index, k=0, 1, 2, . . . , M−1, M is integer, and M>0.

The plurality of estimated channel profiles h[k][i] (i is the channel index) for the plurality of channels are fed to each of the plurality of timing offset generation units 3132, 3134, 3136. In each of the plurality of timing offset generation units 3132, 3134, 3136, the plurality of estimated channel profiles h[k][i] for the plurality of channels are combined to generate a combined channel profile $h_c[k]$. For example, the combining operation performed in the timing offset generation units 3132, 3134, and 3136 can be done in accordance with the equation of:

$$h_c[k] = \sum_{i=0}^{N-1} w_i \cdot h[k][i] \quad \text{if} |h[k][i]| > Thr \qquad (3)$$

wherein i is the channel index, k is the path index, w, is the weighting factor, Thr is a threshold for filtering weak paths, and $h_c[k]$ is the combined channel profile.

Further, a combined timing offset ctoffs and an associated timing offset quality indicator ctoffs_qual are generated based on the combined channel profile $h_c[k]$. For example, the combined timing offset ctoffs may be calculated in accordance with the equation of $$ctoffs = k_{max} = \arg\max_{k \in [0,1,\ldots,M-1]} \|h_c[k]\|^2, \qquad (4)$$

and the associated timing offset quality indicator ctoffs_qual may be SNR or SINR of the combined channel profile.

Similar to FIG. 3A, the post-equalization apparatus 314 comprises a post-equalization unit 3141, 3142, 3143 for each of the plurality of channels, which is configured to perform the channel estimation, channel equalization, interference rejection, etc.

It can be seen from the above illustration with respect to FIG. 3A and FIG. 3B that, the timing compensation performance of a "bad" channel which suffers from stronger fading and interference can be improved by making use of the TOE result of the "good" channel(s). As a result, a more stable and quicker internal timing control loop is achieved so that the demodulation will be performed accurately.

Figure 4:
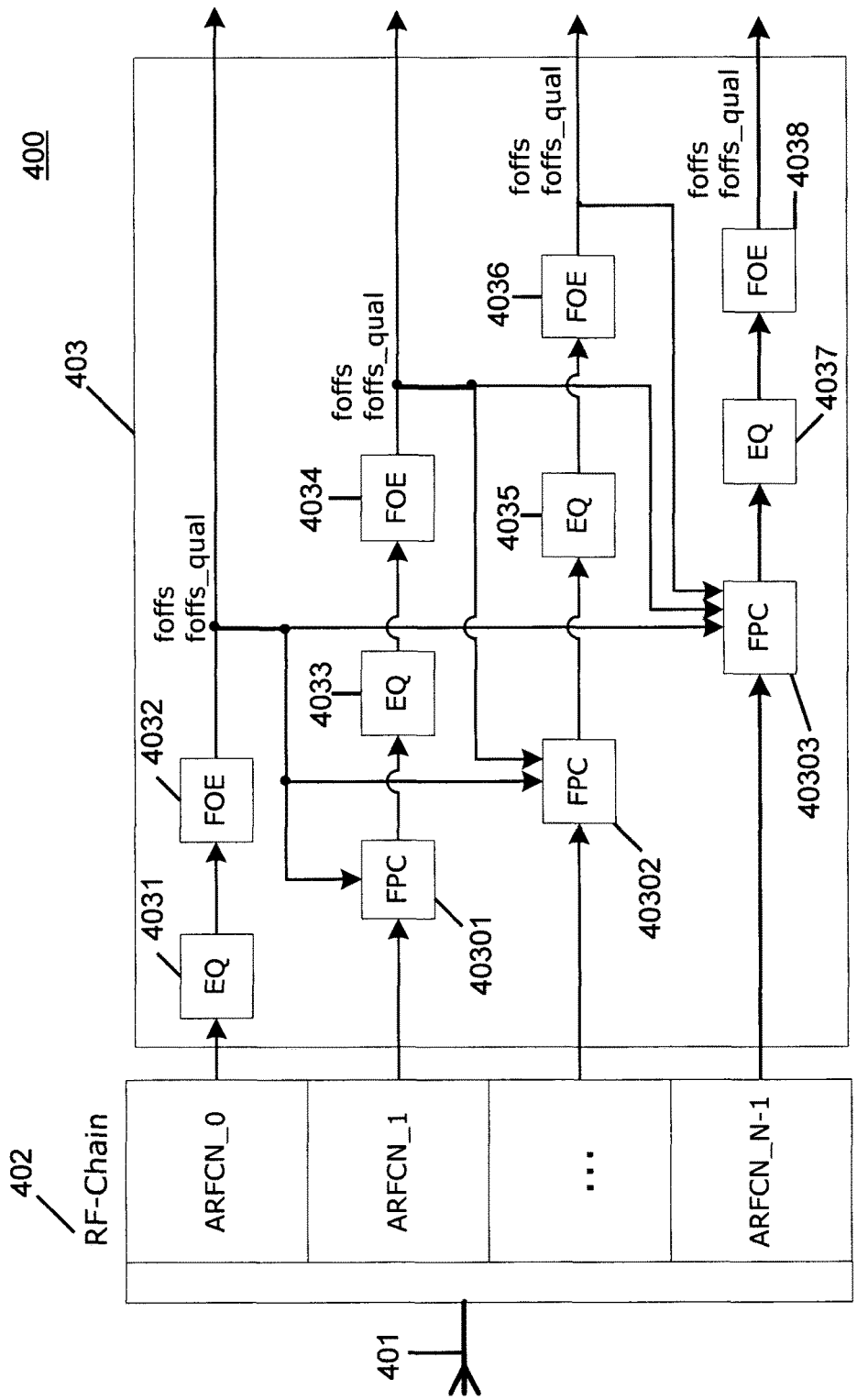
FIG. 4 shows an exemplary block diagram of a receiving device in accordance with yet another aspect of this disclosure.

FIG. 4 illustrates an exemplary block diagram of a receiving device 400 comprising a frequency synchronization information processing apparatus 403 in accordance with yet another aspect of this disclosure.

Generally, in the receiving device of the mobile device or UE, the equalizer(s) is usually required to reverse the distortion incurred by a signal transmitted through a channel before the frequency offset estimation (FOE) so that the intersymbol interference will be reduced to allow the recovery of the transmit symbols. There are several kinds of equalizer such as Linear Equalizer, MMSE equalizer, Zero Forcing Equalizer, Decision Feedback Equalizer, Blind Equalizer, Adaptive Equalizer, Viterbi Equalizer, BCJR Equalizer, Turbo equalizer, and so on.

In practice, the performance of the equalizer usually will be degraded by the frequency offset, and this degradation is even serious for the frequency channel(s) suffering from stronger interference. Therefore, it would be advantageous to pre-compensate for the frequency offset before the equalization.

According to the aspect of this disclosure, an additional frequency pre-compensation (i.e. FPC) unit is added before the corresponding equalizer (i.e. EQ) to pre-compensate the frequency offset of the corresponding channel. In general, one FPC unit is configured to use the FOE result(s) outputted from the FOE unit(s) of the other channel(s) processed previously to estimate the frequency offset for the corresponding channel and pre-compensate such a frequency offset before the equalization performed by the EQ. Generally, the better the channel quality is, the earlier the channel will be processed. As a result, the frequency synchronization performance of the receiving device will be highly improved due to the pre-compensation.

This aspect of the disclosure will be illustrated in greater detail with reference to FIG. 4.

As shown in FIG. 4, there are N frequency channels in the RF-Chain 402. After the amplification and frequency conversion for the signals received by the antenna unit 401 and the RF-chain 402, the resultant baseband signals are input into the baseband signal processing apparatus comprised in the receiving device 400.

In accordance with this aspect of the disclosure, the baseband signal processing apparatus in the receiving device 400 comprises a frequency synchronization information processing apparatus 403.

As depicted in FIG. 4, the frequency synchronization information processing apparatus 403 comprise a channel quality indicator generating unit (not shown in FIG. 4) configured to generate the channel quality indicator such as but not limited to SNR or SINR for each of the plurality of channels. Based on the generated channel quality indicators for the plurality of channels, the frequency synchronization information processing apparatus 403 is configured to determine the order of the channels to be processed. For example, the better the channel quality indicator is, the earlier the corresponding channel will be processed.

For the channel ARFCN_0 with the best channel quality indicator, the base band signal of this channel ARFCN_0 is directly fed into the EQ 4031 to be equalized, and then to the FOE unit 4032. The FOE unit 4032 is configured to estimate the frequency offset for this corresponding channel to generate an estimated frequency offset signal foffs and a FOE quality indicator foffs_qual.

The resultant foffs and foffs_qual generated for the previously processed channels will be fed to each FPC unit of the unprocessed channels. For example, the resultant foffs and foffs_qual generated for the first channel ARFCN_0 will be fed into each FPC unit of all other channels ARFCN_1, ARFCN_2, ARFCN_3, . . . , ARFCN_N−1; and the resultant foffs and foffs_qual generated for the second channel ARFCN_1 will be fed into each FPC unit of the other channels ARFCN_2, ARFCN_3, . . . , ARFCN_N−1 except for the first channel ARFCN_0, and so forth.

In each FPC unit, the plurality of estimated frequency offsets toffs and the FOE quality indicators foffs_qual, which have been fed into such a FPC unit, are combined by employing the above-mentioned diversity combination method such as the MRC method, the Selection Combining (SC) method, the Switched combining method, the Equalgain combining method, and so on. Also, each FPC unit is further configured to perform the pre-compensation operation for the corresponding channel based on the combined result. Then, the pre-compensated signal will undergo the normal equalization processing performed by the EQ unit for the corresponding channel and the further frequency offset estimation processing performed by the FOE unit for the corresponding channel.

In accordance with another aspect of this disclosure, the estimated frequency offset signal foffs and the FOE quality indicator foffs_qual generated in each FOE unit 4032, 4034, 4036, 4038 are fed to the frequency control unit 2042 as depicted in FIG. 2 to further improve the synchronization performance of the receiving device.

Also, as described above, the foffs and foffs_qual will also be sent to each FPC unit of the unprocessed channels for facilitating the pre-compensation of the unprocessed channels.

FIG. 5 shows a simulation result of the residual timing error comparison between the solution with the timing information combination among different channels and the solution without the timing information combination. During the simulation, the MS is assigned with 4 channels ARFCN0, ARFCN1, ARFCN2, ARFCN3, and there are co-channel interferences of −6 dB and −10 dB CIR (Carrier to Interference Ratio) in the channel ARFCN2 and the channel ARFCN3, respectively. There is no interference in the channels ARFCN0 and ARFCN1.

It can be seen from FIG. 5 that, the residual timing error performance (e.g. timing error mean (Terr Mean), timing error standard deviation (Terr STD), minimum timing error (Terr Min), and maximum timing error (Terr Max)) is significantly improved for the channels ARFCN2 and ARFCN3 with the co-channel interferences by combining the estimated timing offsets of the other channels.

Figure 6:
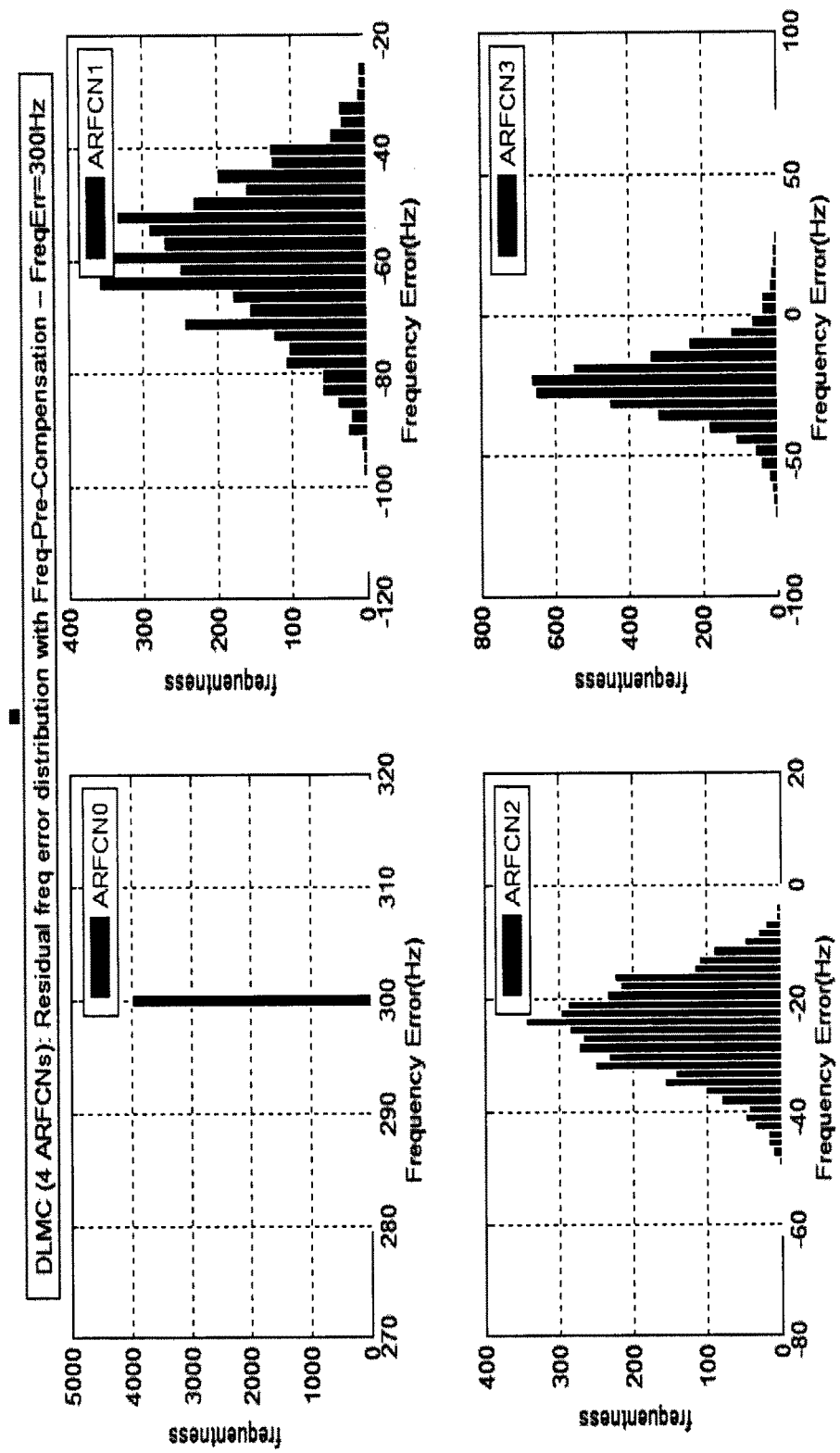
FIG. 6 depicts residual frequency error histograms for different channels.

FIG. 6 depicts the simulation results of the residual frequency error distribution for the different channels ARFCN0, ARFCN1, ARFCN2, and ARFCN3 as depicted in FIG. 5 after applying the FPC unit in accordance with the disclosure, wherein 300 Hz frequency error is added artificially. It can be seen from FIG. 6 that the residual frequency error is significantly decreased for the channels ARFCN1, ARFCN2, and ARFCN3.

Figure 7:
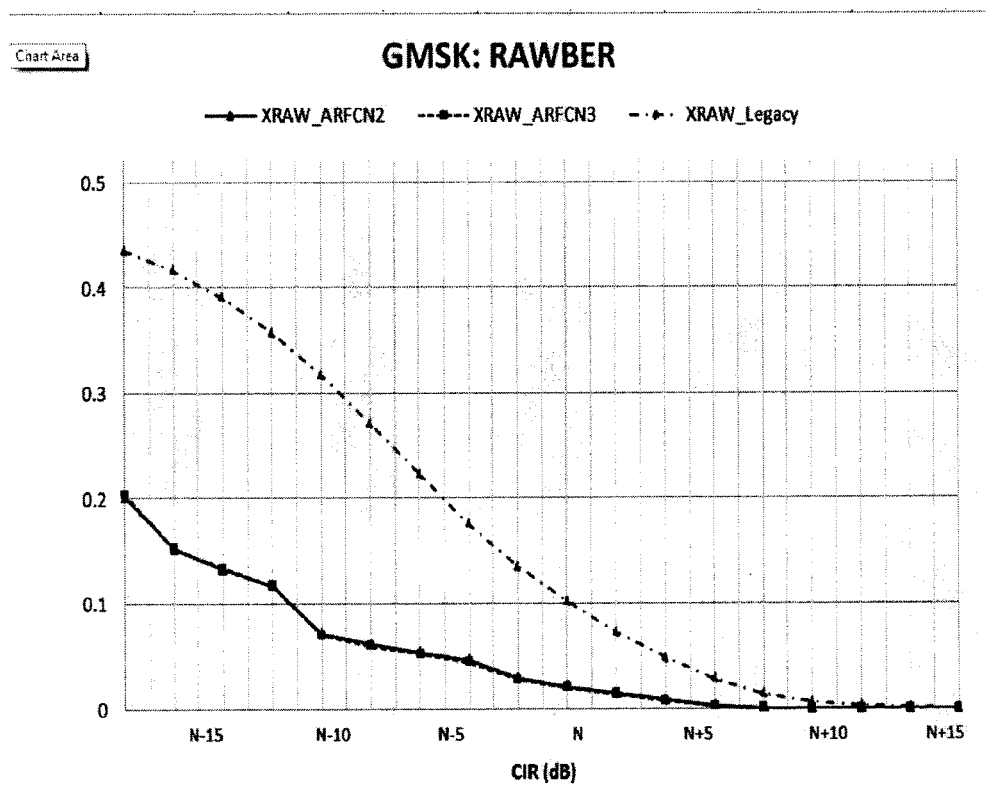
FIG. 7 is a graph depicting a RAW BER (i.e. Bit Error Rate) comparison between the solution with FPC (Frequency Pre-Compensation) and the solution without FPC in GMSK (Gaussian Minimum Shift Keying) scheme.
Figure 8:
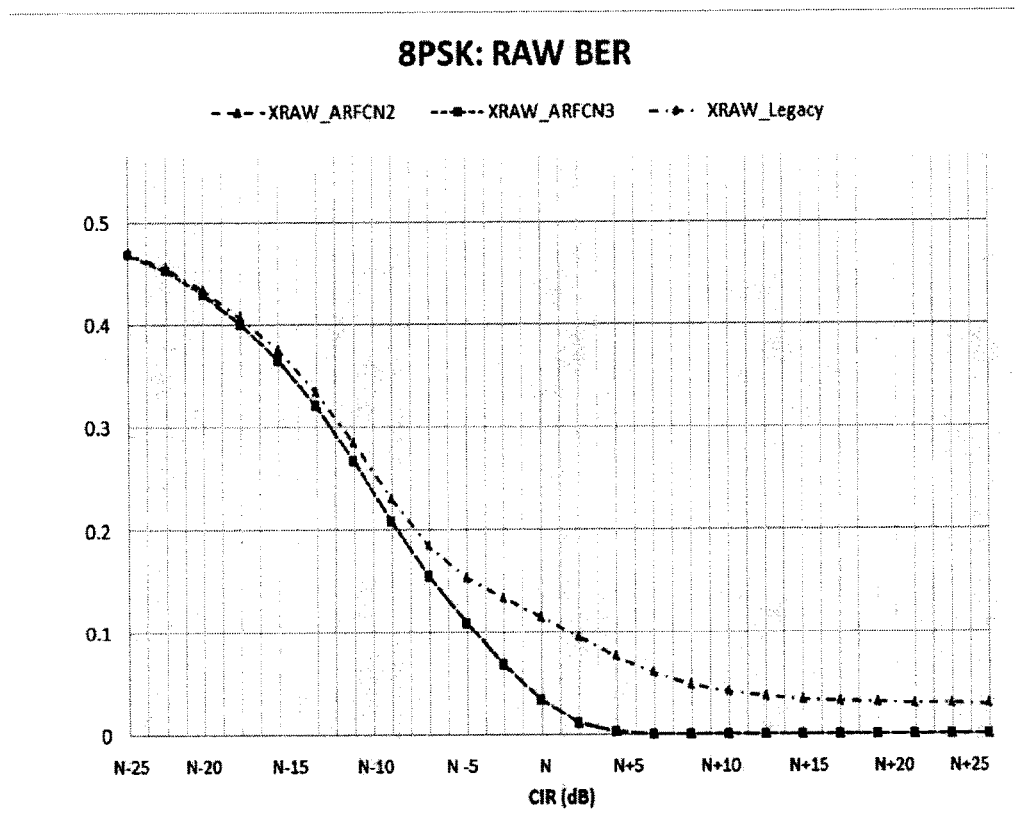
FIG. 8 is a graph depicting a RAW BER comparison between the solution with FPC and the solution without FPC in 8 PSK (8 Phase Shift Keying) scheme.

FIG. 7 is a graph depicting a RAW BER (i.e. Bit Error Rate) comparison between the solution with FPC (Frequency Pre-Compensation) and the solution without FPC in GMSK (Gaussian Minimum Shift Keying) scheme, wherein the same DLMC assignment as FIG. 5 is employed and a CIR (i.e. Committed Information Rate) rang is scanned (e.g. keeping the constraint that the CIR of the channel ARFCN3 is 4 dB lower than that of the channel ARFCN2). FIG. 8 is a graph depicting a RAW BER comparison between the solution with FPC and the solution without FPC in 8 PSK (8 Phase Shift Keying) scheme, wherein the same DLMC assignment as FIG. 5 is employed and a CIR rang is scanned (e.g. keeping the constraint that the CIR of the channel ARFCN3 is 4 dB lower than that of the channel ARFCN2). Please note that the two curves for XRAW_ARFCN2 and XRAW_ARFCN3 are overlapped in FIG. 7 and FIG. 8. It can be seen from FIG. 7 and FIG. 8 that the CIR of XRAW_ARFCN2 and XRAW_ARFCN3 is lower than XRAW_Legacy, which verify a big improvement in RAW BER performance.

Figure 9:
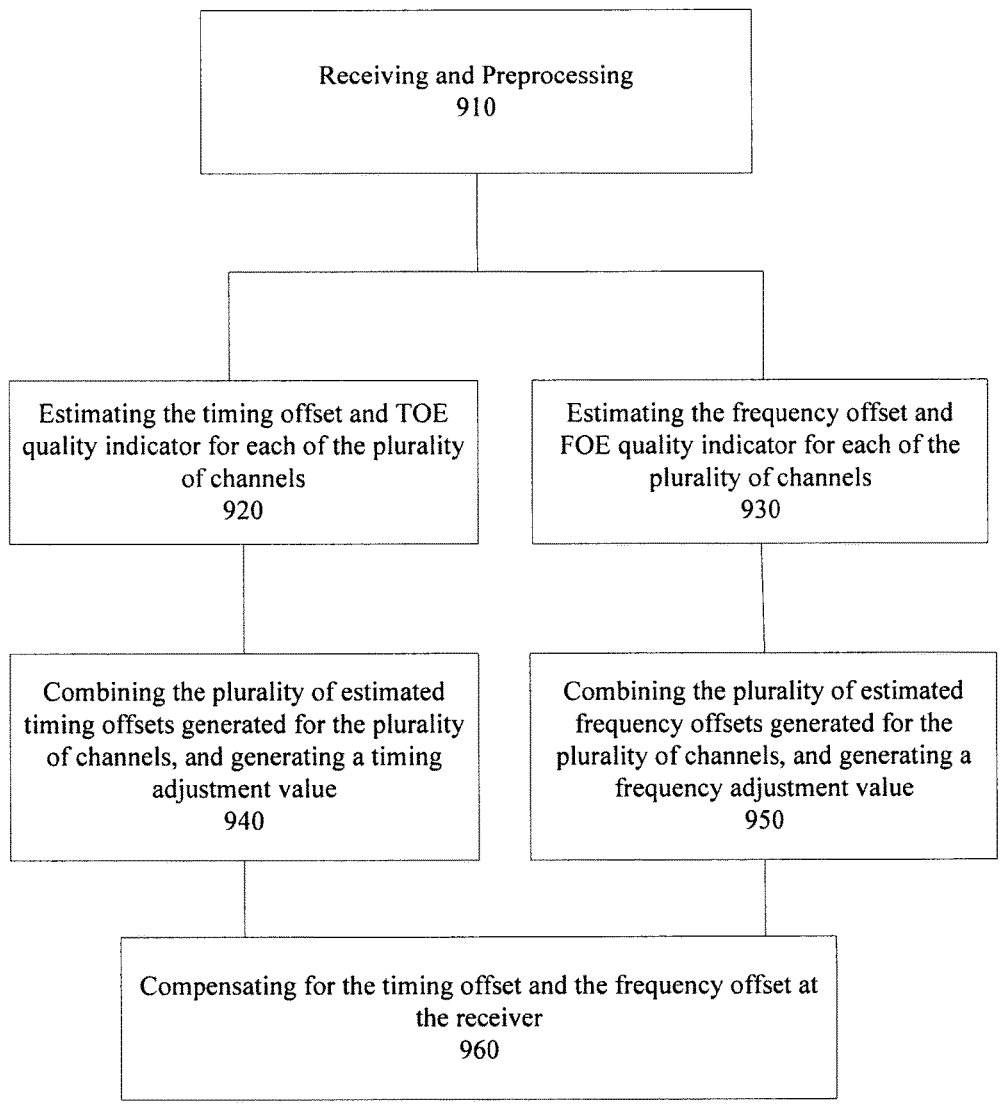
FIG. 9 is a flowchart of a method for processing the synchronization information in accordance with an aspect of this disclosure.

FIG. 9 is a flowchart of a method for processing the synchronization information in accordance with an aspect of this disclosure.

As shown in FIG. 9, at block 910, receiving and preprocessing a plurality of signals transmitted via a plurality of frequency channels. For example, the received signals are amplified and converted to the base band signals.

At block 920, estimating the timing offset for each of the plurality of frequency channels, and generating the estimated timing offset and the timing offset estimation quality indicator (i.e. TOE quality indicator) for each of the plurality of channels.

At block 930, estimating the frequency offset for each of the plurality of frequency channels, and generating the estimated frequency offset and the frequency offset estimation quality indicator (i.e. FOE quality indicator) for each of the plurality of channels. As described above, the TOE quality indicator and the FOE quality indicator are, for example but not limited to, SNR or SINR of the corresponding frequency channel.

At block 940, combining the plurality of estimated timing offsets generated for the plurality of channels by using the diversity combination method as described above and by means of the TOE quality indicators, and generating a timing adjustment value.

At block 950, combining the plurality of estimated frequency offsets generated for the plurality of channels by using the diversity combination method as described above and by means of the FOE quality indicators, and generating a frequency adjustment value.

At block 960, using the timing adjustment value and the frequency adjustment value to compensate for the timing offset and the frequency offset at the receiving device.

Figure 10A:
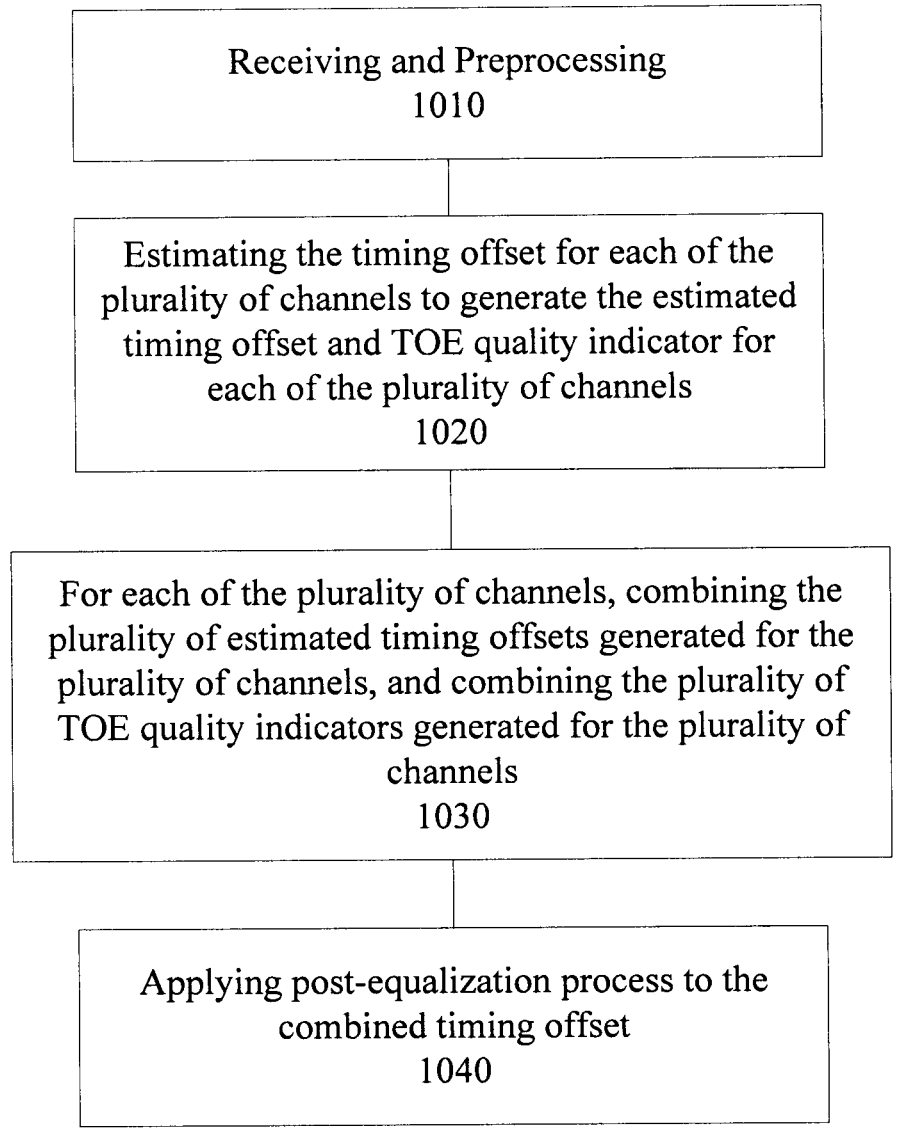
FIG. 10A is a flowchart of a method for processing the timing synchronization information in accordance with an aspect of this disclosure.

FIG. 10A is a flowchart of a method for processing the timing synchronization information in accordance with an aspect of this disclosure.

As shown in FIG. 10A, at block 1010, receiving and preprocessing the plurality of signals transmitted via a plurality of frequency channels.

At block 1020, estimating the timing offset for each of the plurality of frequency channels, and generating the estimated timing offset and the timing offset estimation quality indicator (i.e. TOE quality indicator) for each of the plurality of channels.

At block 1030, for each of the plurality of channels, combining the plurality of estimated timing offsets generated for the plurality of channels by employing the above-mentioned diversity combination method to generate a combined timing offset for the corresponding channel, and also combining the plurality of TOE quality indicators generated for the plurality of channels to provide a reliable TOE quality indicator for the corresponding channel.

At block 1040, applying the post-equalization process such as channel estimation, channel equalization, and/or interference rejection to the combined timing offset. Alternatively, the post-equalized signal will be used to compensate for the timing offset at the receiving device.

Figure 10B:
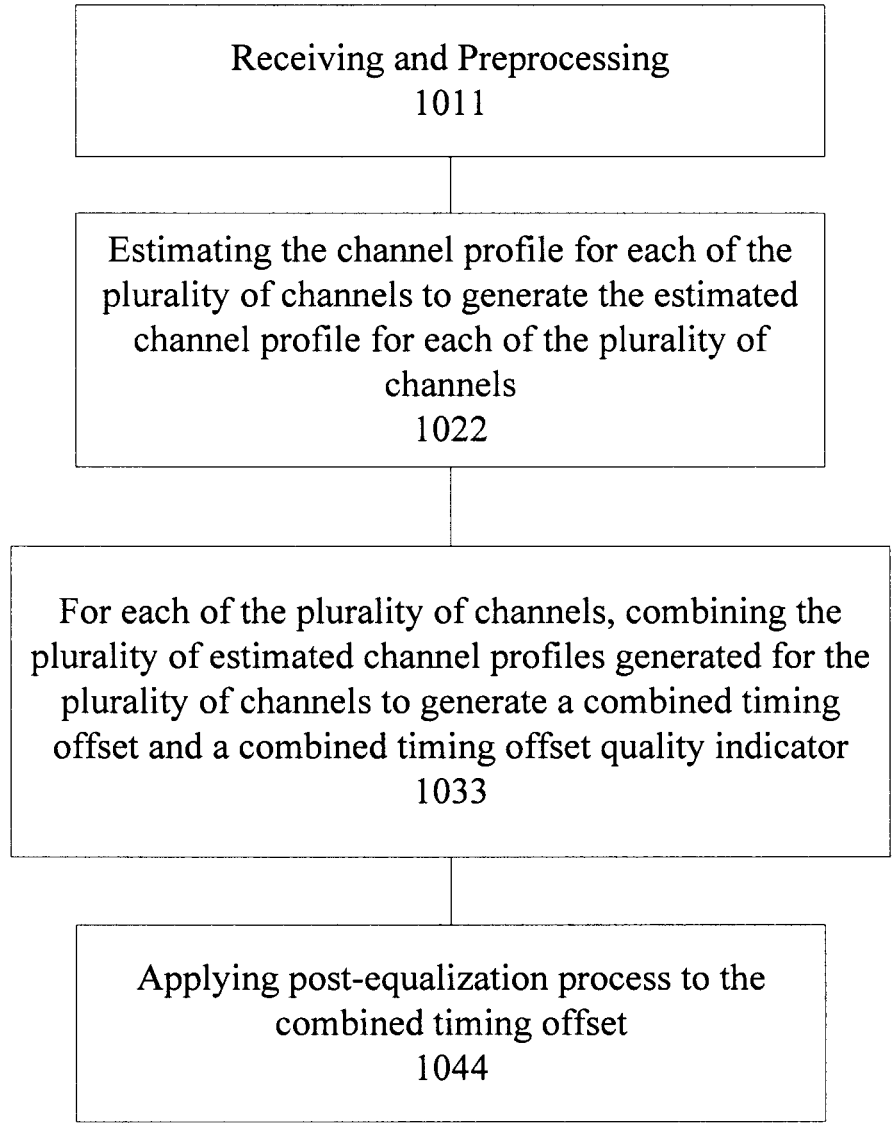
FIG. 10B is a flowchart of a method for processing the timing synchronization information in accordance with another aspect of this disclosure.

In accordance with another aspect of this disclosure, there is provided another exemplary method for processing the timing synchronization information as depicted in FIG. 10B.

Similar to FIG. 10A, at block 1011, receiving and pre-processing the plurality of signals transmitted via a plurality of frequency channels.

At block 1022, estimating the channel profile for each of the plurality of frequency channels to generate the estimated channel profile for each of the plurality of channels.

At block 1033, for each of the plurality of channels, combining the plurality of estimated channel profiles of the plurality of channels and generating a combined timing offset and a combined timing offset quality indicator based on the combined channel profile.

At block 1044, applying the post-equalization process such as channel estimation, channel equalization, and/or interference rejection to the combined timing offset. Alternatively, the post-equalized signal will be used to compensate for the timing offset at the receiving device.

Figure 11:
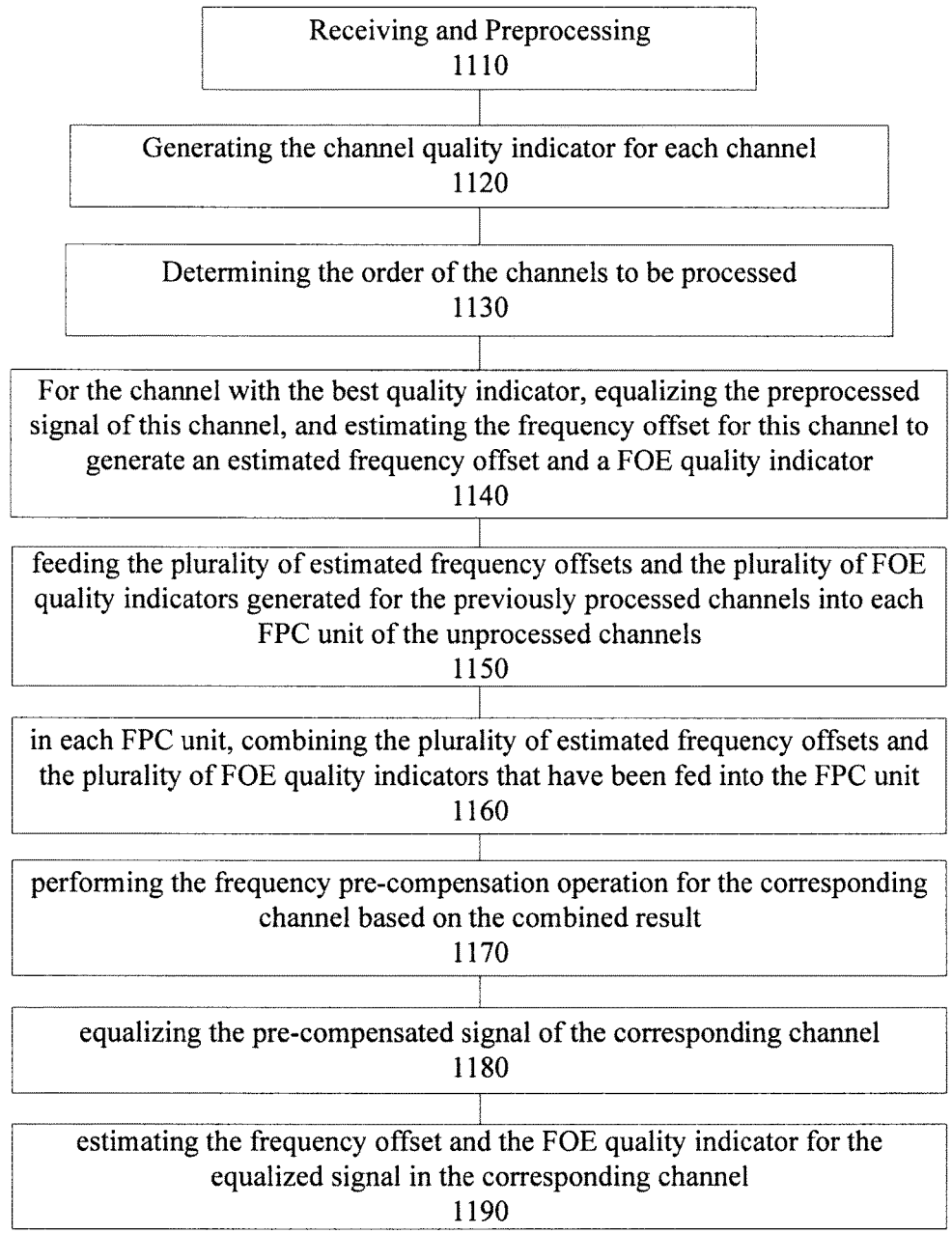
FIG. 11 is a flowchart of a method for processing the frequency synchronization information in accordance with another aspect of this disclosure.

Furthermore, FIG. 11 is a flowchart of a method for processing the frequency synchronization information in accordance with another aspect of this disclosure.

As shown in FIG. 11, at block 1110, receiving and preprocessing a plurality of signals transmitted via a plurality of frequency channels.

At block 1120, generating the channel quality indicator such as SNR or SINR for each of the plurality of channels.

At block 1130, determining the order of the channels to be processed based on the generated channel quality indicators for the plurality of channels. For example, the better the channel quality indicator is, the earlier the corresponding channel will be processed.

At block 1140, for the channel with the best channel quality indicator, equalizing the preprocessed signal of this channel directly, and then estimating the frequency offset for this corresponding channel to generate the estimated frequency offset and the FOE quality indicator.

At block 1150, feeding the plurality of estimated frequency offsets and the plurality of FOE quality indicators generated for the previously processed channels into each FPC unit of the unprocessed channels.

At block 1160, in each FPC unit, combining the plurality of estimated frequency offsets and the plurality of FOE quality indicators that have been fed into the FPC unit by employing the above-mentioned diversity combination method.

At block 1170, performing the frequency pre-compensation operation for the corresponding channel based on the combined result from block 1160.

At block 1180, equalizing the pre-compensated signal of the corresponding channel.

At block 1190, estimating the frequency offset and the FOE quality indicator for the equalized signal in the corresponding channel.

In accordance with an aspect of this disclosure, the estimated frequency offset signal and the FOE quality indicator generated in the block 1190 will be fed to the frequency control unit 2042 as depicted in FIG. 2 to further improve the synchronization performance of the receiving device.

The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The above aspects of the disclosure can be implemented by hardware, software or firmware or a combination thereof. For example the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. Further the teachings herein may be implemented in the form of a software product. The computer software product is stored in a storage medium and comprises a plurality of instructions for making a computer device (which can be a personal computer, a server or a network device such as a router, switch, access point etc.) implement the method recited in the aspects of the disclosure of the present disclosure.

The following examples pertain to further aspects of the disclosure:

Example 1

A receiving device, comprising:
a synchronization information processing apparatus configured to combine synchronization information of a plurality of frequency channels based on time and frequency.

Example 2

The receiving device in accordance with Example 1, wherein
the plurality of frequency channels originate from a transmitting device.

Example 3

The receiving device in accordance with Example 1 or 2, wherein
the plurality of frequency channels share substantially same timing error and frequency error.

Example 4

The receiving device in accordance with Example 1 or 2, wherein
the synchronization information comprises timing synchronization information, frequency synchronization information, or the combination of the timing synchronization information and frequency synchronization information.

Example 5

The receiving device in accordance with Example 1 or 2, wherein
the synchronization information comprises channel profile.

Example 6

The receiving device in accordance with Example 1 or 2, wherein
the synchronization information processing apparatus comprises an offset estimation unit.

Example 7

The receiving device in accordance with Example 6, wherein
the offset estimation unit comprises a plurality of timing offset estimation units associated with the plurality of frequency channels, and each of the plurality of timing offset estimation units is configured to estimate a timing offset associated with the corresponding frequency channel, and to generate an estimated timing offset and a timing offset estimation quality indicator.

Example 8

The receiving device in accordance with Example 6, wherein
the offset estimation unit comprises a plurality of frequency offset estimation units associated with the plurality of frequency channels, and each of the plurality of frequency offset estimation units is configured to estimate the frequency offset associated with the corresponding frequency channel, and to generate an estimated frequency offset and a frequency offset estimation quality indicator.

Example 9

The receiving device in accordance with Example 7 or 8, wherein
the synchronization information processing apparatus comprises a synchronization control unit configured to receive and process the estimated timing offset, the estimated frequency offset, the timing offset estimation quality indicator, and the frequency offset estimation quality indicator.

Example 10

The receiving device in accordance with Example 9, wherein
the synchronization control unit comprises a timing control unit configured to combine the plurality of estimated timing offsets fed into the timing control unit by using a diversity combination method and to generate a timing adjustment value for compensating for the timing offset at the receiving device.

Example 11

The receiving device in accordance with Example 9, wherein
the synchronization control unit comprises a frequency control unit configured to combine the plurality of estimated frequency offsets fed into the frequency control unit by using a diversity combination method and to generate a frequency adjustment value for compensating for the frequency offset at the receiving device.

Example 12

The receiving device in accordance with Example 7 or 8, wherein
the timing offset estimation quality indicator and the frequency offset estimation quality indicator comprise Signal to Noise Ratio (SNR) or Signal to Interference plus Noise Ratio (SINR) of the corresponding frequency channel.

Example 13

The receiving device in accordance with Example 10 or 11, wherein
the diversity combination method comprises Maximal-Ratio Combining method, Selection Combining method, Switched combining method, or Equal-gain combining method.

Example 14

The receiving device in accordance with Example 1 or 2, wherein
the synchronization information processing apparatus comprises a timing synchronization information processing apparatus.

Example 15

The receiving device in accordance with Example 14, wherein
the timing synchronization information processing apparatus comprises a plurality of timing offset estimation units associated with the plurality of frequency channels, and each of plurality of timing offset estimation units is configured to estimate the timing offset associated with the corresponding frequency channel, and to generate an estimated timing offset and a timing offset estimation quality indicator.

Example 16

The receiving device in accordance with Example 14, wherein
the timing synchronization information processing apparatus comprises a plurality of timing offset combining units associated with the plurality of frequency channels, and each of the plurality of timing offset combining units is configured to receive the estimated timing offsets and the corresponding timing offset estimation quality indicators generated for the plurality of frequency channels.

Example 17

The receiving device in accordance with Example 16, wherein,
each timing offset combining unit is further configured to combine the plurality of estimated timing offsets of the plurality of frequency channels by employing the diversity combination method, and configured to generate a combined estimated timing offset.

Example 18

The receiving device in accordance with Example 17, wherein,
each timing offset combining unit is further configured to combine the plurality of timing offset estimation quality indicators of the plurality of frequency channels by employing the diversity combination method, and configured to generate a combined timing offset estimation quality indicator.

Example 19

The receiving device in accordance with Example 14, wherein
the timing synchronization information processing apparatus comprises a plurality of channel profile estimation units associated with the plurality of frequency channels, and each of the plurality of channel profile estimation units is configured to estimate the channel profile for the corresponding frequency channel.

Example 20

The receiving device in accordance with Example 19, wherein
the timing synchronization information processing apparatus further comprises a plurality of timing offset generation units associated with the plurality of frequency channels, and each of the plurality of timing offset generation units is configured to receive the estimated channel profiles generated for the plurality of frequency channels.

Example 21

The receiving device in accordance with Example 20, wherein,
each timing offset generation unit is further configured to combine the estimated channel profiles of the plurality of frequency channels, and to generate a combined channel profile associated with the corresponding channel.

Example 22

The receiving device in accordance with Example 21, wherein,
each timing offset generation unit is further configured to generate a combined timing offset and a combined timing offset quality indicator for the corresponding channel based on the combined channel profile.

Example 23

The receiving device in accordance with any one of Examples 15-22, further comprising
a plurality of post-equalization units associated with the plurality of frequency channels, and each of the plurality of post-equalization units is configured to perform post-equalization on the combined timing offset for the corresponding frequency channel.

Example 24

The receiving device in accordance with Example 1 or 2, wherein
the synchronization information processing apparatus comprises a plurality of equalizers and frequency offset estimation units associated with the plurality of frequency channels, and a plurality of frequency pre-compensation units before the corresponding plurality of equalizers.

Example 25

The receiving device in accordance with Example 24, wherein
the plurality of frequency pre-compensation units are configured to use the plurality of frequency offset estimation results received from the frequency offset estimation units associated with the plurality of channels processed previously, and to estimate the plurality of frequency offsets for the plurality of corresponding channels and pre-compensate the plurality of frequency offsets for the plurality of corresponding channels before the equalization performed by the corresponding plurality of equalizers.

Example 26

The receiving device in accordance with Example 24, wherein
the synchronization information processing apparatus further comprises a channel quality indicator generating unit configured to generate the channel quality indicator for each channel, and the synchronization information processing apparatus determine the order of the channels to be processed based on the generated channel quality indicators for the plurality of channels.

Example 27

The receiving device in accordance with Example 24, wherein the better the channel quality indicator is, the earlier the corresponding channel will be processed.

Example 28

The receiving device in accordance with Example 26 or 27, wherein the channel quality indicator comprises Signal to Noise Ratio (SNR) or Signal to Interference plus Noise Ratio (SINR) of the corresponding channel.

Example 29

The receiving device in accordance with Example 27, wherein,
for the channel with the best channel quality indicator, the signal received via the channel is directly fed into the equalizer to be equalized, and into the frequency offset estimation unit configured to generate the estimated frequency offset and the frequency offset estimation quality indicator for the channel.

Example 30

The receiving device in accordance with Example 29, wherein,
the plurality of estimated frequency offsets and the plurality of frequency offset estimation quality indicators generated for the previously processed channels are fed to each of the plurality of frequency pre-compensation units associated with the plurality of unprocessed channels.

Example 31

The receiving device in accordance with Example 30, wherein,
each of the plurality of frequency pre-compensation units is configured to combine the plurality of estimated frequency offsets and the plurality of frequency offset estimation quality indicators fed into the frequency pre-compensation unit.

Example 32

A user equipment, comprising:
a receiving device as defined in any one of the previous Examples 1-31.

Example 33

A communication system, comprising the user equipment as defined in Example 32.

Example 34

A method for processing synchronization information, comprising:
combining the synchronization information of a plurality of frequency channels originating from a transmitting device based on time and frequency.

Example 35

The method in accordance with Example 34, wherein
the synchronization information comprises timing synchronization information, frequency synchronization information, or the combination of the timing synchronization information and frequency synchronization information.

Example 36

The method in accordance with Example 34, wherein
the synchronization information comprises channel profile.

Example 37

The method in accordance with Example 35, further comprising
estimating a timing offset for each of the plurality of frequency channels and generating an estimated timing offset and a timing offset estimation quality indicator for each of the plurality of channels.

Example 38

The method in accordance with Example 35, further comprising
estimating a frequency offset for each of the plurality of frequency channels and generating an estimated frequency offset and a frequency offset estimation quality indicator for each of the plurality of channels.

Example 39

The method in accordance with Example 37, wherein combining the synchronization information comprises
combining the plurality of estimated timing offsets generated for the plurality of channels by utilizing the plurality of timing offset estimation quality indicators and by employing a diversity combination method, and generating a timing adjustment value.

Example 40

The method in accordance with Example 38, wherein combining the synchronization information comprises
combining the plurality of estimated frequency offsets generated for the plurality of channels by utilizing the plurality of frequency offset estimation quality indicators and by employing the diversity combination method, and generating a frequency adjustment value.

Example 41

The method in accordance with Example 39, further comprising
using the timing adjustment value to compensate for the timing offset at a receiving device.

Example 42

The method in accordance with Example 40, further comprising
using the frequency adjustment value to compensate for the frequency offset at a receiving device.

Example 43

The method in accordance with Example 37, wherein combining the synchronization information comprises, for each of the plurality of channels, combining the plurality of estimated timing offsets and the plurality of timing offset estimation quality indicators generated for the plurality of channels, and generating a combined timing offset and a combined timing offset estimation quality indicator for each of the plurality of channels.

Example 44

The method in accordance with Example 34 or 36, further comprising
estimating the channel profile for each of the plurality of frequency channels and generating the estimated channel profile for each of the plurality of frequency channels.

Example 45

The method in accordance with Example 44, wherein combining the synchronization information comprises,
for each of the plurality of channels, combining the plurality of estimated channel profiles generated for the plurality of channels, and generating a combined channel profile.

Example 46

The method in accordance with Example 45, further comprising,
for each of the plurality of channels, generating a combined timing offset and a combined timing offset quality indicator based on the combined channel profile associated with the channel.

Example 47

The method in accordance with any one of Examples 43-46, further comprising
applying a post-equalization process to the combined timing offset for each of the plurality of channels.

Example 48

The method in accordance with Example 34, further comprising
generating the channel quality indicator for each of the plurality of channels.

Example 49

The method in accordance with Example 48, further comprising
determining the order of the channels to be processed based on the generated channel quality indicators for the plurality of channels.

Example 50

The method in accordance with Example 49, wherein the better the channel quality indicator is, the earlier the corresponding channel will be processed.

Example 51

The method in accordance with Example 49 or 50, further comprising,
for the channel with the best quality indicator, equalizing the signal received via the channel directly, and estimating the frequency offset for the channel, and generating an estimated frequency offset and a frequency offset estimation quality indicator for the channel.

Example 52

The method in accordance with Example 51, further comprising
feeding the plurality of estimated frequency offsets and the plurality of the frequency offset estimation quality indicators generated for previously processed channels into each of the plurality of frequency pre-compensation units associated with the plurality of unprocessed channels.

Example 53

The method in accordance with Example 52, wherein combining the synchronization information comprises,
in each of the plurality of frequency pre-compensation units, combining the plurality of estimated frequency offsets and the plurality of frequency offset estimation quality indicators fed into the frequency pre-compensation unit.

Example 54

The method in accordance with Example 53, further comprising
performing the pre-compensation operation for the corresponding channel based on the combined result.

Example 55

At least one machine readable medium comprising a plurality of instructions that in response to being executed on a computing device, cause the computing device to carry out a method according to any one of Examples 34-54.

Example 56

An apparatus for processing synchronization information, comprising:
means for performing the method according to any one of Examples 34-54.

Example 57

A communication device, comprising:
a processor; and
a memory storing a plurality of instructions that in response to being executed on the processor, cause the processor to carry out a method according to any one of Examples 34-54.

Example 58

A computing device, comprising:
a logic to perform the method according to any one of Examples 34-54.

The invention claimed is:
1. A receiving device, comprising:
a synchronization information processing apparatus configured to combine synchronization information of a plurality of frequency channels based on time and frequency, wherein
the synchronization information comprises an offset estimation unit, the offset estimation unit comprises a plurality of timing offset estimation units associated with the plurality of frequency channels, and each of the plurality of timing offset estimation units is configured to estimate a timing offset associated with the corresponding frequency channel, and to generate an estimated timing offset and a timing offset estimation quality indicator, the offset estimation unit further comprises a plurality of frequency offset estimation units associated with the plurality of frequency channels, and each of the plurality of frequency offset estimation units is configured to estimate the frequency offset associated with the corresponding frequency channel, and to generate an estimated frequency offset and a frequency offset estimation quality indicator, and the synchronization information processing apparatus comprises a synchronization control unit configured to receive and process the estimated timing offset, the estimated frequency offset, the timing offset estimation quality indicator, and the frequency offset estimation quality indicator.

2. The receiving device in accordance with claim 1, wherein
the synchronization control unit comprises a timing control unit configured to combine the plurality of estimated timing offsets fed into the timing control unit by using a diversity combination method and to generate a timing adjustment value for compensating for the timing offset at the receiving device.

3. The receiving device in accordance with claim 1, wherein
the synchronization control unit comprises a frequency control unit configured to combine the plurality of estimated frequency offsets fed into the frequency control unit by using a diversity combination method and to generate a frequency adjustment value for compensating for the frequency offset at the receiving device.

4. The receiving device in accordance with claim 1, wherein
the synchronization information processing apparatus comprises a timing synchronization information processing apparatus.

5. The receiving device in accordance with claim 4, wherein
the timing synchronization information processing apparatus comprises a plurality of timing offset estimation units associated with the plurality of frequency channels, and each of plurality of timing offset estimation units is configured to estimate the timing offset associated with the corresponding frequency channel, and to generate an estimated timing offset and a timing offset estimation quality indicator.

6. The receiving device in accordance with claim 4, wherein
the timing synchronization information processing apparatus comprises a plurality of timing offset combining units associated with the plurality of frequency channels, and each of the plurality of timing offset combining units is configured to receive the estimated timing offsets and the corresponding timing offset estimation quality indicators generated for the plurality of frequency channels.

7. The receiving device in accordance with claim 6, wherein,
each of the plurality of timing offset combining units is further configured to combine the plurality of estimated timing offsets of the plurality of frequency channels by employing the diversity combination method, and configured to generate a combined estimated timing offset.

8. The receiving device in accordance with claim 4, wherein
the timing synchronization information processing apparatus comprises a plurality of channel profile estimation units associated with the plurality of frequency channels, and each of the plurality of channel profile estimation units is configured to estimate the channel profile for the corresponding frequency channel.

9. The receiving device in accordance with claim 8, wherein
the timing synchronization information processing apparatus further comprises a plurality of timing offset generation units associated with the plurality of frequency channels, and each of the plurality of timing offset generation units is configured to receive the estimated channel profiles generated for the plurality of frequency channels.

10. A method for processing synchronization information, comprising:
combining the synchronization information of a plurality of frequency channels originating from a transmitting device based on time and frequency, wherein combining the synchronization information comprises
combining a plurality of estimated timing offsets generated for the plurality of channels by utilizing a plurality of timing offset estimation quality indicators and by employing a diversity combination method, and generating a timing adjustment value, and
combining a plurality of estimated frequency offsets generated for the plurality of channels by utilizing a plurality of frequency offset estimation quality indicators and by employing the diversity combination method, and generating a frequency adjustment value.

11. The method in accordance with claim 10, wherein combining the synchronization information comprises,
for each of the plurality of channels, combining a plurality of estimated channel profiles generated for the plurality of channels, and generating a combined channel profile.

12. The method in accordance with claim 11, further comprising,
for each of the plurality of channels, generating a combined timing offset and a combined timing offset quality indicator based on the combined channel profile associated with the channel.

13. The method in accordance with claim 10, wherein combining the synchronization information comprises,
in each of a plurality of frequency pre-compensation units, combining a plurality of estimated frequency offsets and the plurality of frequency offset estimation quality indicators fed into the frequency pre-compensation unit.

14. A non-transitory machine readable medium comprising a plurality of instructions that in response to being executed on a computing device, cause the computing device to carry out a method according to claim 10.

* * * * *